(12) United States Patent
Guter

(10) Patent No.: US 6,908,560 B2
(45) Date of Patent: Jun. 21, 2005

(54) ZERO BRINE, ZERO RINSE WATER PROCESS FOR TREATMENT OF CONTAMINATED DRINKING WATER FOR REMOVAL OF ARSENIC

(75) Inventor: Gerald A. Guter, San Clemente, CA (US)

(73) Assignee: Basin Water, Inc., San Diego, CA (US)

(*) Notice: Subject to any disclaimer, the term of this patent is extended or adjusted under 35 U.S.C. 154(b) by 64 days.

(21) Appl. No.: 10/388,320

(22) Filed: Mar. 12, 2003

(65) Prior Publication Data
US 2004/0178148 A1 Sep. 16, 2004

(51) Int. Cl.[7] .............................. B01J 49/00
(52) U.S. Cl. .................. 210/675; 210/676; 210/677; 210/688
(58) Field of Search ................. 210/688, 670, 210/675–676, 677

(56) References Cited

U.S. PATENT DOCUMENTS

| 3,366,241 A | 1/1968 | McMorris |
| 3,482,697 A | 12/1969 | Tremont et al. |
| 4,687,582 A | 8/1987 | Dixon |
| 5,069,779 A | 12/1991 | Brown et al. |
| 5,082,570 A * | 1/1992 | Higgins et al. ............. 210/683 |
| 5,182,023 A | 1/1993 | O'Connor et al. |
| 6,066,257 A | 5/2000 | Venkatesh et al. |
| 6,203,708 B1 * | 3/2001 | Lawson et al. ............. 210/661 |
| 6,537,456 B2 | 3/2003 | Mukhopadhyay |
| 6,706,195 B2 * | 3/2004 | Jensen et al. .............. 210/676 |
| 2002/0117431 A1 * | 8/2002 | Jensen et al. .............. 210/134 |

FOREIGN PATENT DOCUMENTS

| CH | 671 759 | 12/1978 |
| WO | WO90/06820 | 6/1990 |
| WO | WO02/48047 | 6/2002 |

OTHER PUBLICATIONS

Clifford, Dennis A. "Ion Exchange and Inorganic Adsorption" *Department of Civil and Environmental Engineering, University of Houston*, Houston, Texas Chapter 9 pp. 9.1–9.91.

* cited by examiner

Primary Examiner—Chester T. Barry
(74) Attorney, Agent, or Firm—Foley & Lardner LLP

(57) ABSTRACT

An ion exchange process for removing arsenic from drinking water is disclosed which uses a mixed ion regenerant and generates minimal levels of waste.

10 Claims, 2 Drawing Sheets

Figure 2. Example of Arsenic Treatment Using the Invention

ZERO BRINE, ZERO RINSE WATER PROCESS FOR TREATMENT OF CONTAMINATED DRINKING WATER FOR REMOVAL OF ARSENIC

FIELD OF THE INVENTION

This invention relates to an ion exchange process for removing arsenic from drinking water. More particularly, it relates to an ion exchange process for removing arsenic from drinking water which additionally contains other ions such as chloride, sulfate and bicarbonate and which generates a minimal volume of waste for disposal.

DESCRIPTION OF THE PRIOR ART

Arsenic has long been recognized as an unacceptable contaminant in drinking water. Arsenic is typically present in water as arsenate ion $(A_5O_4)^{-3}$. In recent years, as greater demands are being made on ground water supplies, there is an increasing need to use arsenic-contaminated water sources. To do this, the arsenic levels must be reduced or eliminated.

In addition to arsenic contamination, the water supplies to be treated regularly contain bicarbonate, chloride and sulfate ions. These ions are commonly present at absolute levels that are higher than the level of arsenic (arsenate) contamination. However, at these levels these additional ions are not considered a risk or a problem.

Contaminants such as arsenic can be removed by conventional ion exchange processes. These processes start out by using a bed of ion exchange resin in the chloride form and pass the contaminated water through the bed. Chloride ion is called the "presaturant". The resin bed prefers to adsorb the contaminant ion which contaminant is removed from the influent water onto the bed and other noncontaminant ions are also removed to some extent. As these ions are picked up by the bed, the bed releases the presaturant ion, chloride, into the product stream. The result is a water product with reduced contaminant levels. The resin bed is then regenerated by using a salt (sodium chloride) brine solution. This requires that truck loads of salt be brought to the treatment site to make the brine. A waste steam concentrated in salt and a contaminant is formed. The used brine must be discarded to waste. In many systems, as much as 1 to 5 percent of the total water production must be discarded as waste.

Clifford and Gurue demonstrated a type of recycling in an ion exchange process for the removal of arsenic. In this case several doses (about 10 doses) of fresh regenerating brine were combined to begin with. This brine had sufficient strength to allow the brine to be used 10 times. When the brine was used, the accumulation of arsenic was tolerable to the process because arsenic was not reabsorbed onto the column when the brine was reused. Instead of discarding the brine at this point, the brine was treated with ferric chloride which formed an insoluble complex with the arsenic in the brine. After removal of the arsenic sludge, the brine was fortified with sodium chloride and the 10 fold batch of brine used another 10 times.

STATEMENT OF THE INVENTION

An improved process for removing arsenic contamination from drinking water using ion exchange has now been found. In accord with this process the ion exchange resin is regenerated with a regenerant solution having ions which correspond to noncontaminant ions also present in the contaminated drinking water feed.

Thus, this invention provides a process for removing arsenic contamination from an arsenic-contaminated drinking water source additionally comprising feed water levels of at least one and preferably at least two noncontaminant ions selected from the group consisting of chloride, sulfate and bicarbonate. This process has the steps of:

a. Passing the arsenic-contaminated drinking water over a bed of ion exchange resin under conditions whereby the resin selectively absorbs arsenic contamination from the drinking water. This generates the desired arsenic-reduced drinking water product. In view of the relatively low concentrations of arsenic which are harmful, this process can typically have a long bed life such as up to 100 bed volumes or greater. In time, however the bed of ion exchange resin becomes loaded with arsenic.

b. At this point the passing of contaminated drinking water over the bed of arsenic-loaded ion exchange resin is halted.

c. A regenerant solution is then passed over the bed of arsenic-loaded ion exchange resin. The regenerant solution contains concentrated levels of said at least one and preferably at least two of the noncontaminant ions present in the feed water. These concentrated levels are related to one another as the feed water levels are related to one another. As the regenerant is reused, its levels of the various noncontaminant ions will gradually adjust to more accurately duplicate the noncontaminant ions in the feed. The regenerant solution displaces arsenic off of the ion exchange resin and forms a bed of regenerated ion exchange resin. The ions present on the regenerated resin are related to the feed water noncontaminant ion levels. A spent regenerant solution containing an elevated level of arsenic is obtained.

d. The spent regenerant solution is separated from the regenerated ion exchange resin.

e. The separated spent regenerant solution is then treated to selectively convert arsenic into an isolable form and to form a refreshed regenerant solution containing a reduced level of arsenic and concentrated levels of said at least two noncontaminant ions.

f. The isolable arsenic is separated.

g. The refreshed regenerant solution is recycled to step c.

As can be seen, the invention differs from the prior systems in that the resin bed is regenerated with a mixture of noncontaminant ions found in the feed stream, for example preferably two or more of chloride, bicarbonate, and sulfate, to saturate the column with all these ions. An additional difference is that large amounts chloride salt need not be added to continuously fortify the regenerant as it is reused. The total dissolved solids in the regenerant remains essentially constant and can be reused indefinitely since no regenerant need be sent to disposal. A significant difference is that the composition of the treated water is the same or nearly the same as the composition of the influent water except for the arsenic ion.

Other advantages of the invention are that no arsenic peak concentrations are produced in the effluent. Finally, the product water produces a steady composition, rather than variable, and the composition is nearly equal to the feed water composition (less the arsenic contaminant). As already discussed, in the state of the art systems, the product water can differ drastically from the feed water because all sulfate and some bicarbonate in the feed water are converted to chloride.

BRIEF DESCRIPTION OF THE DRAWINGS

This invention will be further described with reference being made tp the drawings in which.

DETAILED DESCRIPTION OF THE INVENTION

Figure 1:
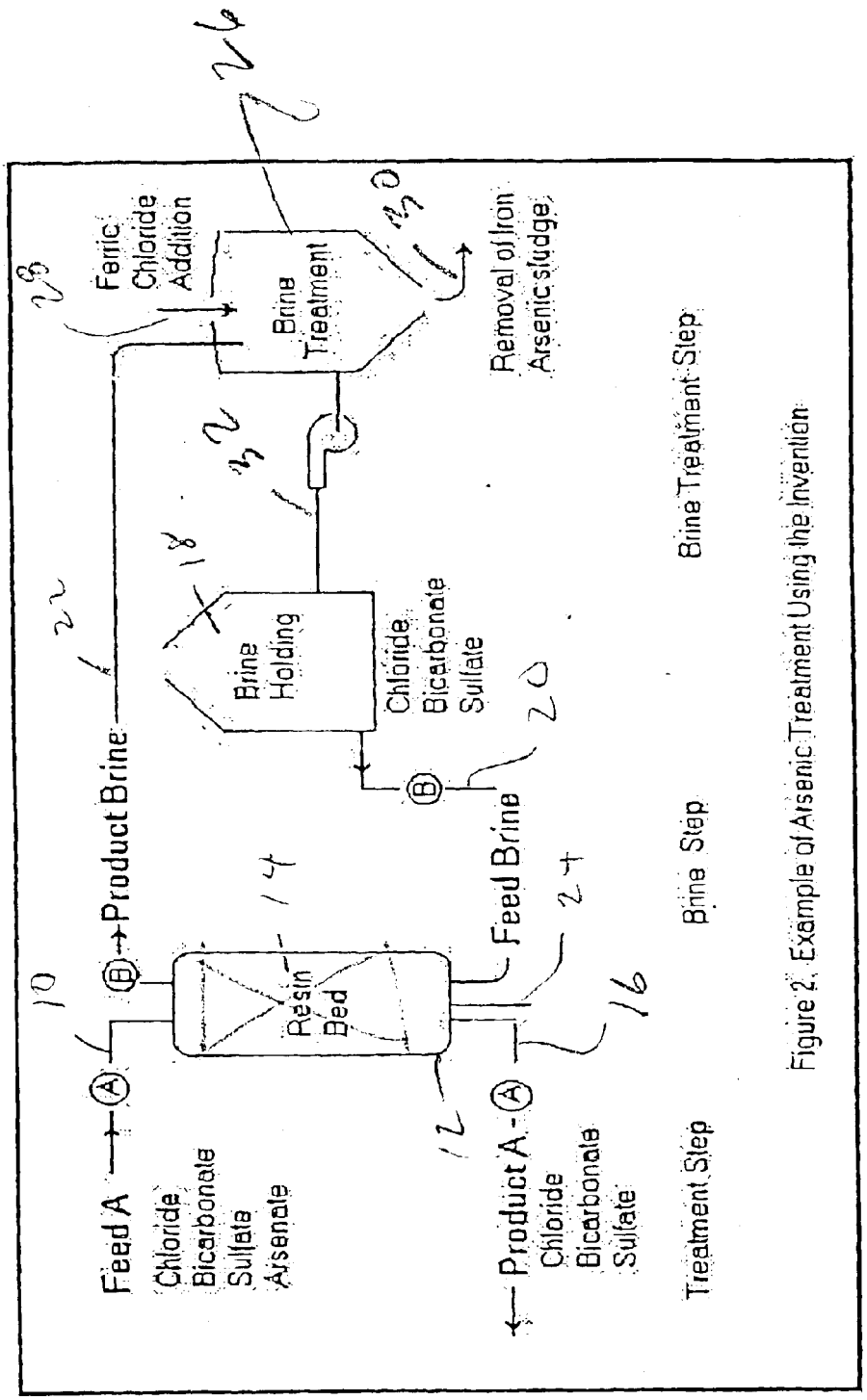
FIG. 1 is a schematic view of an embodiment of the process of the invention.

This invention is a process that removes arsenic from arsenic-contaminated drinking water that also contains at least one noncontaminant ion by (1) passing the contaminated water feed through a bed of anion exchange resin in a ionic form; and (2) reconditioning the bed with a concentrated solution of a mixture of salts which are composed of noncontaminant ions. The anion exchange resin is in a form that contains the major contaminant ions in the untreated water. The major noncontaminant ions in drinking water are chloride, bicarbonate and sulfate. It is found that when the resin's composition is in equilibrium with the major noncontaminant ions of the water solution, such noncontaminant ions will pass through the column and exit the column at the same concentrations as their entrance composition. Arsenic contaminant ions in the drinking water, on the other hand, will not pass through the column until a volume of water has been treated and column saturation has been obtained. Because the process operates by reuse of the treated brine and no waste brine is produced, the process is referred to as the "zero waste" process.

Main advantages of the zero waste process include as follows:

a. The ionic composition of the treated product water is essentially equivalent to the untreated water, except the untreated water contains an arsenic contaminant in undesirable microgram (ppb) quantities. This differs from conventional ion exchange processes where large changes can take place in ionic compositions as the water is treated.

b. Ions transferred from the reconditioning brine to the resin are essentially identical to the primary noncontaminant ions supplied by the untreated water supplies. This also differs from conventional ion exchange where the regenerating brines differ from the water ions and must be replenished from an outside source of salt.

c. Endless recycling and reuse of the reconditioning brine can be done by treating the brine for removal of the arsenic before it is reused or recycled.

d. An advantage of the invention, when c. is included in the invention, is that minimal supply of outside salt is required to maintain brine.

e. A very significant advantage over conventional ion exchange processes is that little or no waste brine is produced.

f. In an additional aspect, the invention allows one to recover and reuse the rinse water produced by the process. The rinse water obtained by rinsing excess brine from the freshly regenerated resin can be treated by a reverse osmosis unit to recover a brine stream that is useful to replenish the recirculating brine supply and simultaneously produce a demineralized water stream for reuse as rinse or as product.

g. The result of using the invention as described above in a. through f. is to operate an ion exchange system to remove arsenic from water without producing waste brine or waste rinse water.

h. A further embodiment of the invention is the use of a steam resin-cleaner system to strip residual salt and volatile material such as NDMA from the regenerated resin and recover the brine and rinse water.

As shown in FIG. 1, the process consists of three steps: the Treatment Step, the Resin Reconditioning Step and the Brine Treatment step.

Treatment Step. In the treatment step, water of drinking water quality except for the presence of an arsenic contaminant is passed through a bed of anion exchange resin. In FIG. 1 this is represented by Feed A. If the A valves are open and B valves are closed, Feed A passes through the anion exchange bed and out as Product A. In this step the arsenic contaminant is deposited on the ion exchange bed, the concentration of the contaminant is highest at the top of the bed and is gradually reduced in the lower portions of the bed. The product contains the noncontaminant ions and little or only small amounts of the arsenic contaminant.

As shown in more detail in FIG. 1, a water feed stream A is fed through line 10 to vessel 12. The feed stream a is a ground water well water or other source of potential drinking water which is characterized by containing contaminating levels of arsenic such as greater than about 5 parts per billion, ("ppb") and especially from about 5 to about 1,000 ppb and most commonly from about 5 to about 100 ppb. of arsenic, usually in the form of arsenate anions.

This feed stream is also characterized by containing feed levels of one or more noncontaminant ions, those are ions which are commonly present in drinking water at levels which are not harmful or which do not interfere with the potability of the water stream, These ions include sulfate, chloride and bicarbonate. Generally the feed stream contains more than one of these ions and most commonly all three are present. Also, it is usual that the amounts of these ions is very large, in absolute terms as compared to the amount of arsenic present. For example, sulfate levels routinely encountered in drinking water steams are from about 10 to about 500 parts per million ("ppm") and especially from 20 to about 250 ppm; chloride levels range from 10 ppm to about 1,000 ppm and more commonly 20 to 500 ppm; bicarbonate ranges from about 5 to about 250 ppm and especially from about 10 to about 150 ppm. These ion levels can be measured from time to time, but also may be understood to remain relatively constant in a feed stream. Similarly, the relative proportions of these ions one to another can be determined or generally known.

The feedstream A is brought in contact with resin bed 14 within vessel 12. Resin bed 14 is most commonly a bed of particulate anion exchange resin, particularly a strong base anion exchange resin. These materials are available commercially and may be selected from the following and their equivalents. Resin bed 14 substantially fills vessel 12, for example filling at least about 85%, and preferably at least about 90% and more especially at least about 93% of the vessel volume. (In all cases these percentage fill values are based upon swollen resin in a ready to use state.) Resins suitable for use in water treatment units have been described in the art and are selected depending upon the nature of the contaminant being removed. Table I lists a variety of available resins which can be used and describes the contaminants which they remove.

TABLE 1

| Prolate Strong Base Resins Type 1 and Type 2 |
| --- |
| Amberlite IRA-400 |
| Amberlite IRA-900 |
| Dowex SBR |

TABLE 1-continued

Prolate Strong Base Resins Type 1 and Type 2

Ionac ASB-1
Ionac AFP-100
Dowex SBR-P
Dowex 11
Duolite A-102-D
Ionac ASB-2
Amberlite IRA-93
Amberlite IR-45
Purolite A-400
Purolite A-600
Ionac A-260
Dowex WGR
Sybron SR6
Sybron SR7
Reillex ™ HPQ Resins (based on
polyvinyl pyridene polymers)
Nitrex The ion exchange resins which are presently preferred for use in the process of the invention are strong base resins. These resins are based on various polymer structures such as polystyrene with cross-linkers and with appropriate active groups such as quaternary ammonium attached:
Other ion exchange resins which are applicable to the invention such as for treating various cations are strong acid or weak base type resins such as:

Amberlite IR-120
Ionac C-20
Prolate C-100
Ionac C-270
Amberlite-200
Ionac CFS

Generally, the strong base type I resins, particularly those based on polystyrene backbones, give good overall results removing nitrate and perchlorate as well as arsenic and the like and are preferred. This contacting is almost always a continuous flow contacting with the resin present as a fixed or semifluidized bed. The resin in bed 14, when refreshed, in an ionic form corresponding to the noncontaminant ions present in the feed streams. For example, if the feed stream contains sulfate, chloride and bicarbonate in approximately equal proportions (by moles) then the resin could be initially charged with essentially an equimolar proportions of these three ions. Alternatively, the resin can be initially charged with a single ion or a nonequilibrium mixture. As will be shown, in time it will reach equilibrium with the noncontaminant ions in the feed. When the feed stream passed over the resin, the resin preferentially adsorbs arsenate out of the water and exchanges the noncontaminant ions therefore. Since the amount of arsenate is small, in absolute terms, relative to the noncontaminant ions present in the feed stream A, the amounts of noncontaminant ions added to the product water as it flows out of the vessel 12 are essentially undetectable. Thus, the product water, which is removed for use though line 16 is substantially identical to the feed water with the exception that its arsenic level has been reduced to less than 5 ppm and often essentially to zero.

The rate at which the feed water is fed over the resin can range from an hourly space velocity ("HSV") of 1 or 2 bed volumes per hour to as much as 10 to about 20 bed volumes per hour. In general terms, one can use most conventional ion exchange procedures in terms of flow direction, flow distribution and the like when effecting this contacting.

Resin Reconditioning Step. Over time, the resin bed 14 becomes loaded with arsenic. At this point the bed is taken out of service and is regenerated. this is done feeding a brine solution from brine holding vessel 18 through line 20. A bed volume of the brine is brought into contact with the resin. This contacting is usually carried out countercurrent to the flow of water to vessel 12 where it comes in contact with the spent resin. This brine solution is not a simple sodium chloride brine. Rather it is a brine made up of the noncontaminant ions present in the feed water, that is at least one and preferably at least two and especially all three of sulfate, chloride and bicarbonate in the relative proportions that these noncontaminant ions appear in the feed water. The total salt content of the brine ranges from about 2% by weight to about 25% by weight and especially from about 3% to about 20% by weight. The absolute concentration of the salts in the brine is not particularly critical and can be selected at a higher level, if desired.

Generally, from about a single bed to about 10 bed volumes and especially from about 1.5 to about 5 and especially about 2 to 3 bed volumes of brine is used and commonly the contact period between the brine and the resin can range from a few seconds to a longer period such as up to several hours, if desired. It will be appreciated that the frequency of regenerating the arsenic-contaminated beds is generally not great, such as not more than once every hundred bed volumes of water treated or greater. Accordingly, there is only a marginal advantage to be had by rushing the contacting of the resin and the brine to its shortest possible period. The brine containing the arsenic contaminant flows into the brine treatment tank.

Brine Treatment Step. After the brine has displaced the arsenic off of the resin, the arsenic-contaminated brine which results is taken off of the vessel 12 via line 22. The contaminated brine can be pushed through line 22 by rinse water fed though line 24. The spent brine is passed to vessel 26 where it is treated to convert the arsenic content into a form that is physically separable or isolable from the brine. One effective way to do this is to precipitate the arsenic. An effective precipitation of the arsenic (arsenate) involves adding a metal compound which will coprecipitate with the arsenic. Trivalent metal halides such as ferric chloride or aluminum chloride can be added via line 28 and are converted to their insoluble hydroxides in water. The insoluble hydroxides will cause the arsenate to coprecipitate. The solid is removed via line 30. The brine, which has now had its arsenic level dramatically reduced is recycled to vessel 18 via line 32. As can be seen, essentially no waste brine is generated. A modest amount of make of salt(s) corresponding to one or more of the noncontaminant ions may need to be added from time to time as the total amount of salt consumed is equal to the moles of arsenate removed.

While the invention has been described in terms of a single vessel, in some preferred aspects, multiple vessels are employed.

Figure 2:
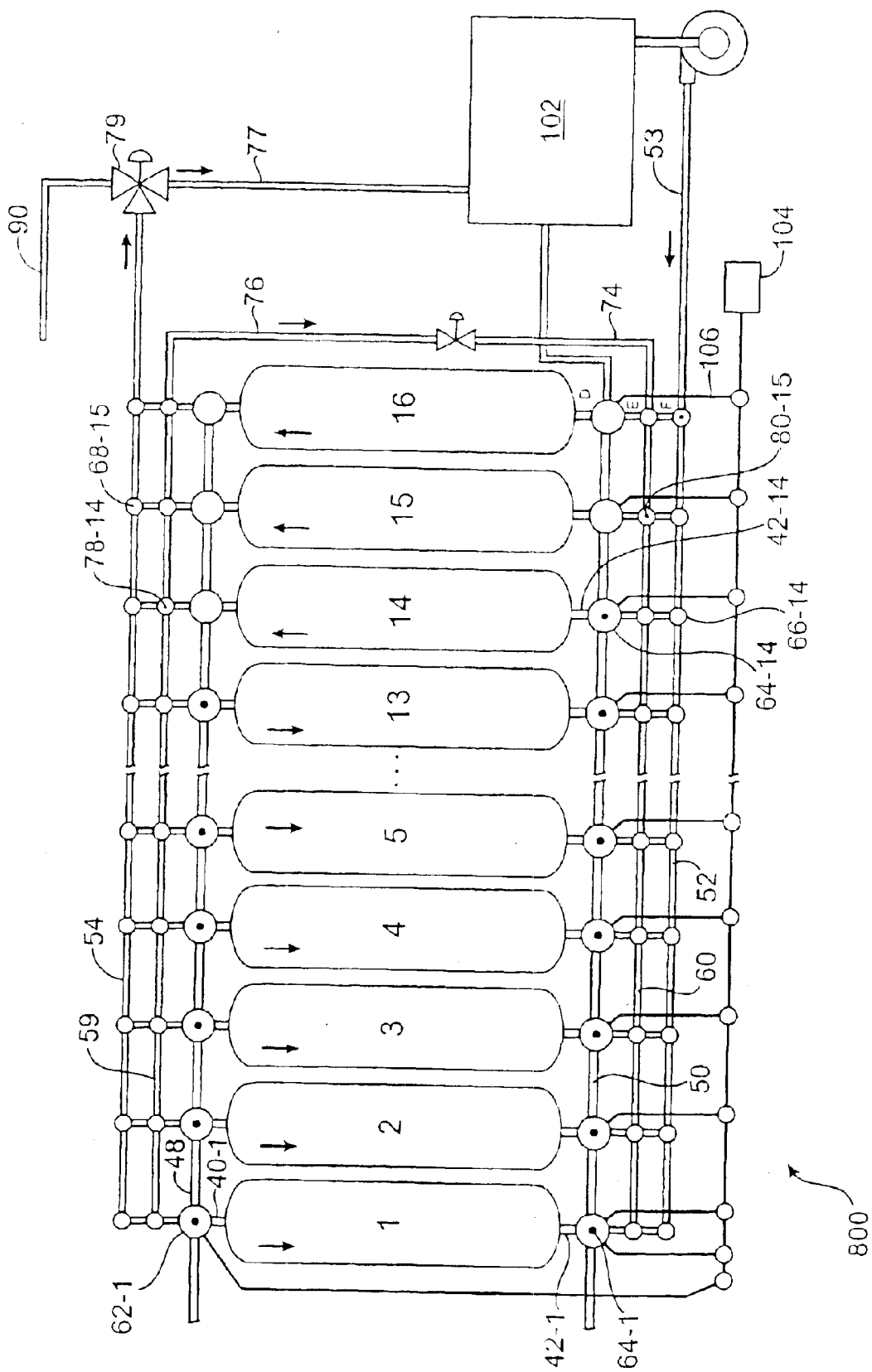
FIG. 2 is a schematic view of a multi-vessel embodiment of the process of the invention.

This embodiment of the arsenic removal system of the invention is shown in FIG. 2 as system 200. System 200 includes sixteen vessels 12-1 through 12-16. The numbering of elements of the process is in accord with the numbering used with FIG. 1. Arsenic-contaminated water is feeding through the resin beds in vessels 12-1 through 12-13. Purified water is being withdrawn from these thirteen vessels through headers 42-1 and valve 64-1, etc and collected in manifold 50 for use. Again, valves 64-1 through 64-13 all are shown with a dot to show a positive fluid flow.

Vessels 12-14 through 12-16 are not in service removing arsenic and purifying water. The resin beds in vessels 12-15 and 16 are undergoing regeneration with a brine solution made up of the noncontaminant ions present in the feed and the bed in vessel 12-14 is being rinsed to remove spent brine prior to being returned to service.

In this representative preferred process, vessel 12-16 is taken out of service filled with water. Regenerant brine that has already been partially used by being first passed upflow through vessel 12-15 is passed through manifolds 60 and 59 and lines 74 and 76 to the bottom of vessel 12-16 and passed upflow through that vessel. The volume of this flow of brine is generally from at least about ½ of a bed volume to about 3 bed volumes and especially from about 1 to about 3 bed volumes. The first about ⅓ bed volumes of regenerant fed to vessel 12-16 displaces the water present in the vessel. This volume of water can be sent to product water or it can be discarded via line 90, or it can be sent to the brine tank 102 via manifold 54, valve 79 and line 77. This last alternative is preferred. The remaining regenerant passing through vessel 12-16 at this stage can be recycled to the brine tank together with the water but preferably up to about one bed volume is sent to waste via manifold 54, valve 79 and line 90.

The volume of used regenerant fed to vessel 12-16 is equal to a volume of fresh regenerant fed to vessel 12-15 via line 53 and manifold 52. Thus, at the completion of this stage of regeneration, vessel 12-16 is full of used regenerant and vessel 12-15 is full of fresh regenerant.

Controller 104 then reconfigures the valves associated with vessels 12-14, 12-15 and 12-16 for the next stage of regeneration. In this stage, fresh rinse water is passed from manifold 50 through valve 64-14 upflow through vessel 12-14. Vessel 12-14 is full of used rinse water previously added as will be described. The fresh rinse water, ½ to about 1 bed volumes and preferably about ⅔ of a bed volumes, pushes used rinse water from vessel 12-14 to manifold 59 and 60 and line 76 where it passes upflow into vessel 12-15 now pushing the fresh brine previously added to 12-15 before it. This about ⅓ bed volumes of fresh brine followed by some amount of rinse water, typically at least about ⅙ bed volumes to about 1 bed volumes and especially about ⅓ bed volumes, are taken off via manifold 54 and passed though valve 79 and line 77 to brine tank 102.

At this stage in the regeneration process, vessel 12-14 has been completely rinsed and is ready to be placed in service. Vessel 12-15 is full of partially used rinse water and vessel 12-16 is full of partially used regenerant brine. When the next vessel comes off line, for example vessel 12-1, 12-14 will go into service. The regeneration cycle begins anew with fresh brine being fed into vessel 12-16 to displace brine into vessel 12-1. Thereafter fresh rinse liquid will be added to vessel 12-15 to displace its rinse liquid contents to vessel 12-16, etc.

System 200, with the flow directions just described, has proven very effective for treating water having arsenic as its principal contaminant. As has been described, the contaminated brine which is produced when arsenic is the contaminant, needs to be treated to further recover the arsenic.

Before returning the resin bed to service, the excess brine should be excluded from the vessel either by opening a drain to drain the excess or by circulating a rinse water through the bed. Although recycling the rinse water is not related to the ion exchange part of the invention, modifications of this invention provide for the reuse of the rinse water. One method uses steam stripping and a second method uses reverse osmosis. These methods are described below.

Repeated Steps. The above steps can be repeated indefinitely or any number of required times.

The invention can be more specifically embodied in the following representative

EXAMPLES

Set Up Conditions For Arsenic Removal
Untreated Water Composition
Chloride 140 mg/L
Bicarbonate 65 mg/L
Nitrate trace 0.1 mg/L
Sulfate 130 mg/L
Arsenic 26 ppb=0.00069 meq/L The starting reconditioning solution composition can be any noncontaminant ion or a mixture of the major noncontaminant ions. As will be shown over time it picks up ions to match the composition of the noncontaminant ion in the feed water. It is preferred that the bed be homogeneous. If the untreated water contains sulfate ion, sulfate should be a reconditioning solution component. In this case the starting reconditioner composition for this example is:

Sulfate=4000 meq/L or 193,000 mg/L (made up from $Na_2SO_4$=576 g/L) (or $K_2SO_4$=712 g/L)

The volume of the reconditioning solution used for each cycle is 2.6 bed volumes.

The starting resin composition, a type 1 anion exchange resin in the sulfate form. The capacity of the resin is 1300 mg/L.

The brine treatment step consists of the addition of ferric chloride to precipitate the arsenic-ferric hydroxide complex. Experience indicates that this step will reduce the arsenic in the treated brine to a low value of 1.5 mg of As (or 0.04 meq/L). (Although a small amount of chloride is added because of the small amount of arsenic to be precipitated, the addition of chloride ion by this operation is negligible and does not significantly change the brine composition.)

The changes in composition for several cycles.

The process uses the three steps as described above: the Treatment Step, the Resin Reconditioning step, and the Brine Treatment step. The following Tables illustrate the ionic compositions as the process steps are carried out and repeated for several cycles. It is noted that as the steps are repeated, initial changes will occur in the concentrations until a steady state is reached for all of the concentrations of the noncontaminant ions.

TABLE 1

CHANGES IN PROCESS STREAM COMPOSITION, MEQ/L, THROUGH 50 CYCLES

| | Feed A Untreated |
|---|---|
| Chloride | 3.94 |
| Bicarbonate | 1.07 |
| Nitrate | 0.001 |
| Sulfate | 2.71 |
| Arsenic | 0.00069 |

TABLE 1-continued

CHANGES IN PROCESS STREAM COMPOSITION, MEQ/L, THROUGH 50 CYCLES

| Product A | Cycle 1 | Cycle 2 | Cycle 3 | Cycle 4 | Cycle 5 | Cycle 10 | Cycle 20 | Cycle 35 | Cycle 50 |
|---|---|---|---|---|---|---|---|---|---|
| Chloride | 2.82 | 2.76 | 3.31 | 3.44 | 3.58 | 3.86 | 3.94 | 3.94 | 3.94 |
| Bicarbonate | 0.99 | 1 | 1 | 1 | 1.01 | 1.03 | 1.05 | 1.06 | 1.06 |
| Nitrate | 0.0001 | 0.0001 | 0.0005 | 0.0007 | 0.0008 | 0.00097 | 0.001 | 0.001 | 0.001 |
| Sulfate | 3.89 | 3.95 | 3.4 | 3.27 | 3.12 | 2.82 | 2.72 | 2.71 | 2.71 |
| Arsenic | 0.0000676 | 0.0000678 | 0.0000949 | 0.0000929 | 0.000091 | 8.71E-05 | 0.0000865 | 0.000087 | 0.000086 |

| Feed Brine | Cycle 1 | Cycle 2 | Cycle 3 | Cycle 4 | Cycle 5 | Cycle 10 | Cycle 20 | Cycle 35 | Cycle 50 |
|---|---|---|---|---|---|---|---|---|---|
| Chloride | 0 | 68.42 | 83.43 | 100.83 | 113.07 | 140.12 | 146.81 | 146.95 | 146.73 |
| Bicarbonate | 0 | 3.66 | 6.62 | 9.38 | 11.91 | 21.71 | 32.77 | 37.98 | 38.94 |
| Nitrate | 0 | 0.028 | 0.03 | 0.032 | 0.034 | 0.036 | 0.037 | 0.037 | 0.037 |
| Sulfate | 4000 | 3928 | 3910 | 3890 | 3875 | 3838 | 3820 | 3814 | 3813 |
| Arsenic | 0 | 0.04 | 0.071 | 0.074 | 0.075 | 0.04 | 0.04 | 0.04 | 0.04 |

| Product Brine | Cycle 1 | Cycle 2 | Cycle 3 | Cycle 4 | Cycle 5 | Cycle 10 | Cycle 20 | Cycle 20 | Cycle 50 |
|---|---|---|---|---|---|---|---|---|---|
| Chloride | 68.42 | 83.43 | 100.83 | 113.07 | 122.16 | 142.18 | 146.83 | 146.95 | 146.79 |
| Bicarbonate | 3.66 | 6.62 | 9.38 | 11.91 | 14.22 | 23.23 | 33.34 | 37.98 | 38.86 |
| Nitrate | 0.028 | 0.03 | 0.032 | 0.034 | 0.035 | 0.037 | 0.037 | 0.037 | 0.037 |
| Sulfate | 3928 | 3910 | 3890 | 3875 | 3863 | 3834 | 3819 | 3814 | 3813 |
| Arsenic | 0.04 | 0.071 | 0.074 | 0.075 | 0.075 | 0.075 | 0.075 | 0.075 | 0.075 |

Table 1. shows the concentrations of the chemical components of the untreated water in the upper left under the title "Feed A".

Below this listing are the compositions of the Product A, the Feed Brine, and the Product Brine for cycles 1 through 50.

Note the following:

a. Arsenic removal from the untreated water is about 87 to 90 percent.

b. The brine composition for cycle 1 is the sulfate only composition of the starting brine composition.

c. The cycle 1 product is higher in sulfate and lower in chloride than the untreated water. As the cycles continue, the Product A composition gradually approaches the Feed A compositions.

d. The Feed Brine composition gradual changes by increasing the chloride to 147 meq/L and the sulfate gradually decreases to 3820 meq/L at cycle 50.

e. The Product Brine composition gradually approaches the composition of the noncontaminant ion in the feed water as the cycles increase.

f. A characteristic of the invention is that changes in the composition of the process streams gradually will approach a condition where the concentrations of the major noncontaminant ions on the ion exchange column are in equilibrium with the Feed Water and the recirculating brine compositions

Example 2

A field test was conducted to verify the most difficult and challenging features of the invention. The conventional use of ion exchange as described above and in many publications and text books uses an anion resin in the chloride form to remove trace quantities of arsenic in the form of $HA_sO_4^{(-2)}$ mixed with normal concentrations of chloride, sulfate, and bicarbonate ions. Such a process requires the continued regeneration of the resin to the chloride form by using a sodium chloride brine as a regenerant.

It would not be expected to be able to remove the arsenic from a column that would be mainly in the sulfate form and be able to regenerate the resin with a sulfate brine. The following challenge test was designed in a pilot plant environment:

A pilot plant was used containing a 10 cubic feet (1 BV 75 gallons) of type I strong base ion exchange resin. The resin was in the chloride form to start with. Water from a well having the following composition was pumped through the bed at a rate of 12 gallons/ft$^2$/min (1 BV/min) for approximately 7 hours until the sulfate concentration of the effluent equaled that of the influent. The bed was regenerated with 2 BV of 4% sodium sulfate brine and rinsed with 1 BV of rinse water.

Arsenic=26 ppb
Cl=140 mg/L
HCO$_3$=65 mg/L
SO$_4$=130 mg/L

The challenge test was to cycle the resin three complete times in the sulfate mode beginning with a sodium an adsorption step and followed by a sulfate brine regeneration. The resin column and brine were preconditioned by starting with the resin in the chloride form, and performing two complete cycles of adsorption/regeneration with a 4% sodium sulfate brine which was discarded after two cycles. The two cycles were considered necessary to bring the column to a steady state condition and bring the system into the sulfate mode of operation.

After the preconditioning procedure a supply of 120 gallons (1.6 BV) of 3% fresh brine was prepared for use and reuse. The test was continued as follows:

Step 1. Treat 100 BV of influent water, take samples for arsenic analyses every 10 BV.

Step 1a. Regenerate the bed using the 1.6 BV of 3% freshly prepared sulfate brine which was stored in a 120 gallon storage tank.

Step 2. Treat 100 BV of influent water, take samples for arsenic analyses every 10 BV.

Step 2a Regenerate the bed using the 1.6 BV of used 3% sulfate brine produced by Step 1a.

Step 3 Treat 100 BV of influent water, take samples for arsenic analyses every 10 BV.

Step 3a. Regenerate the bed using the 1.6 BV of used 3% sulfate brine produced by Step 2a.

Step 4 Treat 100 BV of influent water, take samples for arsenic analyses every 10 BV.

Step 4a. Regenerate the bed using the 1.6 BV of used 3% sulfate brine produced by Step 3a.

The bed was rinsed after each regeneration.

It should be noted that no arsenic waste was removed from the brine during this challenge test.

TABLE 2

Arsenic Levels In Treated Water During Field Test

| Measured During Step | Average Arsenic (ppb) in Effluent | Range, ppb | Times Brine Reused |
|---|---|---|---|
| 1 | 2.54 | ND–4.5 | 1 |
| 2 | 1.43 | ND–4.8 | 2 |
| 3 | 5.99 | 4.3–6.3 | 3 |
| 4 | 5.37 | 4.3–7.8 | 4 |

Influent Arsenic=33 ppb

The analyses were performed using the graphite furnace method with detection limits ranging from 2 to 4 ppb. If results were reported below the detection limit, the value was assumed to be zero. The data show that the arsenic levels were reduced by 88 to 95 percent, and appear to be dependent on the number of times that the brine is reused.

The above challenge test indicates that the invention has been reduced to practice because it confirms the following:

a. After the preconditioning of the resin, the resin which was not in the chloride form was able to remove arsenic from the influent water.

b. The spent resin could be regenerated with a sulfate brine by removing arsenic from the resin.

c. Regenerations with sodium sulfate were effective even though no arsenic was removed from the brine. It is assumed that if the test were continued for more cycles that the arsenic in the brine would build up until no arsenic would be removed from the column.

The invention as described above, involves the use of a resin in a packed bed column which becomes exposed to a reconditioning solution to prepare the resin for the next adsorption cycle. Residual material such as high TDS salts and contaminant material must be removed to restore the resin before the resin can be placed into service to treat further quantities of contaminated water. (This is also a requirement of any ion exchange process wherein the resin is regenerated with a strong salt solution of regenerating brine.). If waste water disposal facilities are available the rinse water can be disposed to such facilities. If disposal facilities are not available the used rinse water must be processed to remove impurities and then can be reused.

A further addition to the invention is any system which will rinse the resin with a rinse water supply which can be cleaned by treatment and recycled. Minimal treatment required for application to the invention is concentration or separation of the dissolved material from pure rinse water. Two such systems are described in this section for use with the invention.

Reverse Osmosis. The combination process can be described as follows:

a. The invention is operated as described above to remove microgram quantities of arsenic from a typical groundwater also containing chloride, sulfate, and bicarbonate.

b. The adsorption cycle treats approximately 100 bed volumes of contaminated water.

c. The spent column is restored by treatment with 10 BV of a solution from a restoration supply tank. This solution contains approximately 500 meq/L of anion materials comprising mostly sulfate ion and minor amounts of chloride and bicarbonate. This solution is also approximately 3% dissolved solids. (Arsenic is precipitated from the restoration solution, each cycle or after n cycles, as appropriate.)

d. At the end of the above restoration step, 9.5 BV of restoration solution is recovered and stored in a restoration supply tank for further use. Approximately 0.5 BV remains in the system's "hold up volume" comprising the voids between the resin beads and in vessel piping.

e. The resin tank and piping are then rinsed with 4 BV of clean rinse water. The 4 BV of rinse water that is recovered contains the 0.5 BV of "hold up" reconditioning solution. 0.5 BV of clean rinse water takes its place as "hold up" water in the system. This 0.5 BV of cleane rinse water is recovered from the next cycle of treated water and is placed in a clean rinse supply tank.

f. The 4 BV of spent rinse water is treated by reverse osmosis to concentrate the solids into a volume of 0.5 BV. The RO product water will approximate 3.5 BV, will have very low TDS, and is transferred to the clean rinse supply. The 0.5 BV of 3% solution is added to the restoration solution tank.

The net result is that all of the 4 BV of rinse water is recovered for reuse and the "hold up salts" are recovered for reuse as restoration solution. No waste rinse water or waste restoration solution or waste brine is produced by the process. RO system operation is quite normal in that the water to be treated by RO is a sulfate rich water and 87.5% water recovery and production of 3% brine is normal.

Hot Water/Steam Cleaning. The combination process can be described as follows:

Excess solids left in the system hold up can be removed from the system after step 4, above by injecting hot water and/or steam into the system. The steam and or hot water are produced by distillation of rinse water. This operation will produce a concentrate that can be added to the replenishment solution. This method has a special feature in that volatile material can be removed from the resin to prevent further contamination of the water supply.

What is claimed is:

1. A process for removing arsenic contamination from an arsenic-contaminated drinking water source additionally comprising feed water levels of at least one noncontaminant ion selected from the group consisting of chloride, sulfate and bicarbonate said process comprising a. passing the arsenic-contaminated drinking water over a bed of ion exchange resin under conditions whereby the resin selectively absorbs arsenic contamination from the drinking water thereby forming an arsenic-reduced drinking water product and a bed of arsenic-loaded ion exchange resin, b. halting the passing of drinking water over the bed of arsenic-loaded ion exchange resin, c. passing a regenerant solution over the bed of arsenic-loaded ion exchange resin, said regenerant solution comprising concentrated levels of said at least one noncontaminant ion said concentrated levels being related to one another as the feed water levels are related to one another, thereby displacing arsenic off of the ion exchange resin and forming a bed of regenerated ion exchange resin, the ions present on the regenerated resin being related to the feed water noncontaminant ion levels, and a spent regenerant solution, said spent regenerant solution containing an elevated level of arsenic, d. separating the spent regenerant solution from said regenerated ion exchange resin, e. treating the separated spent regenerant solution to selectively convert arsenic into an isolable form and to form a refreshed regenerant solution containing a reduced level of arsenic and concentrated levels of said at least one noncontaminant ion, f. isolating the isolable arsenic and g. recycling the refreshed regenerant solution to step c.

2. The process of claim 1 wherein the regenerant solution contains at least two noncontaminant ions selected from chloride, sulfate and bicarbonate ions.

3. The process of claim 2 wherein the regenerant solution contains concentrated levels of said at least two noncontaminant ions said concentrated levels being related to one another as the feed water levels of these ions are related to one another.

4. The process of claim 1 wherein the isolable form is a precipitate.

5. The process of claim 4 wherein the precipitate is a gel.

6. The process of claim 4 wherein the precipitate is an iron hydroxide/isolable arsenic coprecipitate.

7. The process of claim 1 wherein the flow of regenerant solution is carried out countercurrent to the direction of flow of contaminated drinking after over the bed.

8. The process of claim 1 additionally comprising the step of:

h. rinsing the regenerated ion exchange resin with water to provide a rinse water.

9. The process of claim 8 additionally comprises the step of:

i. recovering the rinse water and removing water from it and returning the regenerant solution salts present in the recovered rinse water to the regenerant solution.

10. The process of claim 1 additionally comprising the step of steam stripping solids out of the regenerated resin.

* * * * *